July 17, 1934.　　　　　　S. COHEN　　　　　　1,966,918
VARIABLE CONDENSER
Filed March 16, 1932
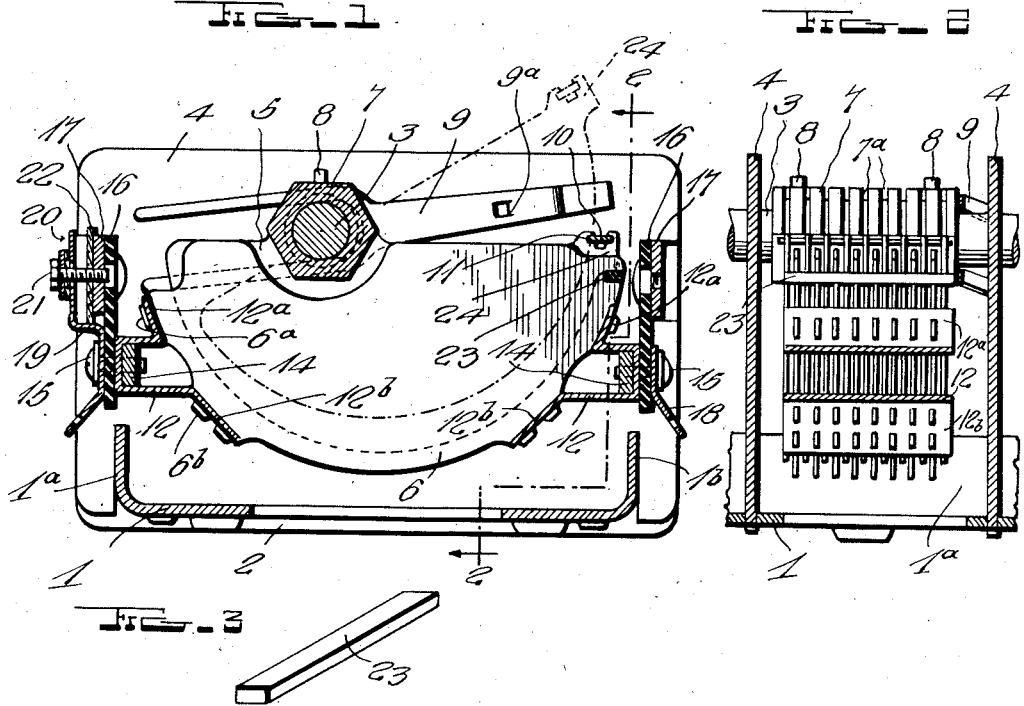
INVENTOR.
Samuel Cohen
BY John O. Brady
ATTORNEY Patented July 17, 1934

1,966,918

UNITED STATES PATENT OFFICE 1,966,918

VARIABLE CONDENSER

Samuel Cohen, Brooklyn, N. Y., assignor to General Instrument Corporation, New York, N. Y., a corporation of New York Application March 16, 1932, Serial No. 599,241

5 Claims. (Cl. 175—41.5)

My invention relates broadly to variable electrical condensers and more particularly to a construction of insulated limiting stop for controlling the movement of the rotor plates of the variable condenser with respect to the stator plates with which the rotor plates are arranged to be interleaved.

One of the objects of my invention is to provide a construction of variable condenser in which an insulated stop is carried adjacent the stator plates for abutment with a member carried by the rotor plates for limiting the relative interleaving movement of the rotor plates with respect to the stator plates.

Another object of my invention is to provide a construction of insulated stop arranged to be carried by the stator plates of a variable condenser in alignment with a member carried by the rotor plates for limiting the movement of the rotor plates with respect to the stator plates during the interleaving operation of said plates.

Still another object of my invention is to provide a construction of insulated abutment which may be readily inserted upon the stator unit of a variable condenser for providing a limiting stop for a member carried by the rotor plates for preventing rotation of the rotor plates with respect to the stator plates beyond a range of 180°.

Other and further objects of my invention reside in the construction of rotary variable condenser and limiting stop for determining the extent to which the rotor plates may be interleaved with respect to the stator plates as set forth more fully in the specification hereinafter following by reference to the accompanying drawing, in which:

Figure 1 is an elevational view showing a variable condenser constructed in accordance with my invention and illustrating the arrangment of insulated stop carried by the stator plates and with which a member carried by the rotor plates is arranged to abut; Fig. 2 is a cross-sectional view taken on line 2—2 of Fig. 1 and showing the insulated stop; and Fig. 3 is a perspective view of the insulation member employed in the construction of condenser illustrated in Figs. 1 and 2.

Referring to the drawing in more detail, reference character 1 designates the condenser chassis or cradle having upstanding side portions 1a and 1b. The cradle is provided with end plate members designated at 2 in which the rotor shaft 3 is journaled. Electrostatic shield plates 4 extend laterally of the condenser chassis and provide compartments within which the sections of the multiple variable condenser are arranged. Each section of the condenser includes a set of rotary plates 5 and a cooperating set of stator plates 6. The sets of rotor plates 5 are carried by the sleeve 7 located on the shaft 3 and is grooved as represented at 7a to receive the notched edges of the rotor plates 5 for securing the plates 5 in position for rotation in accordance with the movement of shaft 3. The sleeve 7 is secured in position on shaft 3 by means of set screws 8 which may be adjusted by means of a socket wrench or other tool. The sleeve 7 is subjected to frictional contact on the end thereof by means of resilient forked strip 9 which bears against the shield plate 4 at one side and against the end of sleeve 7 at the other side. The resilient forked strip 9 is secured with respect to the shield plate 4 by means of a lug 9a struck from the strip 9 and entering an aperture in the shield plate 4. The constant friction thus applied against the end of sleeve 7 enables the rotor shaft 3 to be moved with precision adjustment and maintained in any one of the positions to which the shaft is adjusted. The rotor plates 5 are keyed at one extremity thereof by means of a key strip 10 which engages oppositely disposed grooves 11 in the rotor plates 5. In Figs. 1 and 2 I have shown the key strip 10 disposed in a plane parallel to the plane of the edges of the rotor plates 5. In the modified forms of the condenser construction the key strip 10 has been shown disposed in a plane normal to the plane of the edges of the rotor plates 5.

The sets of plates 6 constituting the stator unit are supported from opposite ends thereof by means of channel shaped members 12 having oppositely extending angularly disposed portions 12a and 12b which serve as seats for lugs extending from the edges of the stator plates 6. These lugs have been designated at 6a and 6b extending through slots formed in the angularly disposed portions 12a and 12b of the channel shaped members 12, the lugs being upset to form a rigid connection between the stator plates 6 and the channel shaped supports 12. The channel shaped supports 12 each enclose a longitudinally extending member 14 which is screw threaded to receive the screw members 15 which pass through the lower portions of the insulated panels 16 which depend from the supporting frame members 17 which extend longitudinally of the condenser chassis. The suspension of the stator plates from the downwardly depending insulated panels 16 is such that the stator plates are centered within the condenser chassis and spaced away from the side walls thereof. A connecting lug 18 is secured under the head of one of the supporting screws 15 while the plate member 19 of the compensating condenser 20 is secured under the head of the opposite screw 15. The plate 19 is adjustable toward or away from the longitudinally extending frame member 17 by means of adjusting screw 21 which enters the frame member 17, passing through the dielectric sheet 22. Adjustment of the plate 19 toward or away from the longitudinally extending frame member 17 serves to adjust the capacity of the condensating condenser 20 in shunt with the stator and rotor plates constituting each condenser unit.

In order to prevent short-circuiting between the stator and rotor plates I provide an insulated bar 23 adapted to engage the edges of the stator plates 6 in the path of movement of the projection 24 on the rotor plates 5. In order to secure the insulated bar 23 in the sets of stator plates, I provide notches in the edges of the stator plates 6 through which the insulated bar 23 passes. The insulated bar 23 is in this way locked in position and provides an abutment against which the extension 24 contacts in the course of the interleaving movement of the rotor plates with respect to the stator plates. The projection 24 is the portion of the rotor plates 5 in which slots 11 are provided for receiving the key strip 10. The bar 23 is formed from insulation material and provides an obstruction preventing movement of key strip 10 to such a position where contact may be made with the edges of the stator plates. The bar 23 is formed of insulation material and has been illustrated in Fig. 3. The bar 23 is secured into position with respect to the stator plates by the frictional engagement thereof with the notches formed in the edges of the stator plates 6.

I have found that the mounting of the insulated strip on selected parts of the stator plates provides an inexpensive and practical method of insulating the rotor plates with respect to the stator plates at the same time producing minimum dielectric losses.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In a variable condenser, a set of stator plates, a set of rotor plates, means for variably interleaving said rotor plates with respect to said stator plates, a projection formed on said rotor plates, means extending through said projection for maintaining said rotor plates in predetermined spaced relation, said stator plates having aligned notches adjacent the upper extremity thereof, an insulated bar extending through said notches and between each of said stator plates and confined within the limits of said set of stator plates and projecting in the path of the projection on said rotor plates and operating as a limiting stop for said rotor plates in one extreme position thereof and preventing short-circuit between said rotor plates and said stator plates.

2. In a variable condenser, rotor and stator units arranged to be rotatably interleaved, a projection on one extremity of said rotor unit, an insulated bar projecting through notches formed in the adjacent extremity of said stator unit and forming an abutment for said projection on said rotor unit for preventing short circuiting of said units.

3. In a variable condenser, rotor and stator units comprising plates arranged to be variably interleaved, the plates constituting said rotor unit each having an aligned peripheral projection, the plates constituting said stator unit each having a peripheral recess in coacting alignment with the peripheral projection on said rotor plates, said stator plates having peripheral notches cut therein adjacent the peripheral recesses therein, and an insulated bar extending through said notches normal to the planes of said stator plates and forming a limiting abutment for the peripheral projections on said rotor plates for preventing electrical contact between said rotor and stator units when said rotor plates are moved to the maximum capacity position with respect to said stator plates.

4. In a variable condenser, rotor and stator units comprising plates arranged to be variably interleaved, the plates constituting said rotor unit each having an aligned peripheral projection, the plates constituting said stator unit each having a peripheral recess in coacting alignment with the peripheral projection on said rotor plates, said stator plates having peripheral slots cut therein adjacent the peripheral recesses therein, and a rectangular bar of insulation material extending through said slots normal to the planes of said plates and forming limiting abutments for the peripheral projections on said rotor plates for preventing electrical contact between said rotor and stator units when said rotor plates are moved to the maximum capacity position with respect to said stator plates.

5. In a variable condenser, rotor and stator units comprising plates arranged to be variably interleaved, the plates constituting said rotor unit each having an aligned peripheral projection, the plates constituting said stator unit each having a peripheral recess in coacting alignment with the peripheral projection on said rotor plates, said stator plates having peripheral slots extending into said stator plates for a distance substantially equal to the length of the peripheral projections on said rotor plates, an insulated bar conforming in cross-section to the contour of said slots extending through said slots normal to the planes of said stator plates and forming a limiting abutment for the peripheral projections on said rotor plates for preventing electrical contact between said rotor and stator units when said rotor plates are moved to the maximum capacity position with respect to said stator plates.

SAMUEL COHEN.